(12) United States Patent
Haler

(10) Patent No.: US 9,168,875 B2
(45) Date of Patent: Oct. 27, 2015

(54) QUICK RELEASE ATV RACK SYSTEM

(71) Applicant: Bradley Haler, Belgrade, MT (US)

(72) Inventor: Bradley Haler, Belgrade, MT (US)

(*) Notice: Subject to any disclaimer, the term of this patent is extended or adjusted under 35 U.S.C. 154(b) by 98 days.

(21) Appl. No.: 14/157,277

(22) Filed: Jan. 16, 2014

(65) Prior Publication Data

US 2015/0197203 A1 Jul. 16, 2015

(51) Int. Cl.
*B60R 9/06* (2006.01)
*B62J 7/04* (2006.01)
*B62J 7/06* (2006.01)

(52) U.S. Cl.
CPC .... *B60R 9/06* (2013.01); *B62J 7/04* (2013.01); *B62J 7/06* (2013.01)

(58) Field of Classification Search
CPC ................. B60R 9/06; B62J 7/04; B62J 7/06
USPC .................. 224/401; D12/107, 407
See application file for complete search history.

(56) References Cited

U.S. PATENT DOCUMENTS

| | | | | |
|---|---|---|---|---|
| 4,174,796 A * | 11/1979 | Nakamura | ..................... | 224/444 |
| 4,176,771 A * | 12/1979 | Dubroc, Sr. | ..................... | 224/412 |
| 4,247,030 A * | 1/1981 | Amacker | ..................... | 224/401 |
| 4,277,008 A * | 7/1981 | McCleary | ..................... | 224/401 |
| 4,300,706 A * | 11/1981 | Hendrick et al. | ..................... | 224/412 |
| D276,330 S * | 11/1984 | Stahel | ..................... | D12/407 |
| 4,826,057 A * | 5/1989 | Yamada | ..................... | 224/412 |
| D363,267 S * | 10/1995 | Gustavsen | ..................... | D12/407 |
| D364,140 S * | 11/1995 | Gustavsen | ..................... | D12/407 |
| 5,465,882 A * | 11/1995 | Shinohara | ..................... | 224/413 |
| D376,344 S * | 12/1996 | Gogan et al. | ..................... | D12/407 |
| 6,293,450 B1 * | 9/2001 | Aron | ..................... | 224/430 |
| 6,378,748 B1 * | 4/2002 | Cox | ..................... | 224/511 |
| 6,502,728 B2 * | 1/2003 | Savant | ..................... | 224/401 |
| 6,908,138 B2 * | 6/2005 | Yang | ..................... | 296/95.1 |
| 7,044,526 B2 | 5/2006 | Tweet | | |
| 7,134,702 B2 * | 11/2006 | Takahashi et al. | ..................... | 296/37.1 |
| 7,165,702 B1 | 1/2007 | Billberg | | |
| 7,293,680 B1 * | 11/2007 | Wawerski | ..................... | 224/401 |
| 7,377,570 B2 | 5/2008 | Rondeau | | |
| D597,922 S * | 8/2009 | Davis | ..................... | D12/317 |
| 7,854,460 B2 | 12/2010 | Tweet | | |
| 8,096,582 B2 | 1/2012 | Longwell | | |
| 8,251,268 B2 * | 8/2012 | Hanafusa et al. | ..................... | 224/401 |
| 8,646,669 B2 * | 2/2014 | Mann | ..................... | 224/419 |
| D713,775 S * | 9/2014 | Lagermann | ..................... | D12/406 |
| 8,875,830 B2 * | 11/2014 | Massicotte et al. | ..................... | 180/89.1 |
| 2003/0080538 A1 * | 5/2003 | Watts et al. | ..................... | 280/652 |
| 2004/0239088 A1 * | 12/2004 | Rondeau et al. | ..................... | 280/769 |
| 2005/0274573 A1 * | 12/2005 | Smith | ..................... | 182/127 |
| 2006/0054648 A1 | 3/2006 | Maguire | | |
| 2006/0186156 A1 * | 8/2006 | Harycki et al. | ..................... | 224/401 |
| 2007/0175937 A1 | 8/2007 | Caldwell | | |
| 2008/0067825 A1 * | 3/2008 | Joseph et al. | ..................... | 296/3 |
| 2010/0301592 A1 * | 12/2010 | Longwell et al. | ..................... | 280/769 |
| 2011/0198142 A1 * | 8/2011 | Allingham | ..................... | 180/89.11 |
| 2011/0259931 A1 * | 10/2011 | Rellergert | ..................... | 224/401 |

* cited by examiner

*Primary Examiner* — Justin Larson

(57) ABSTRACT

A quick release ATV rack system for allowing a user to selectively increase the amount of cargo storage space on an ATV without removal of passenger seating with a removable rack. The quick release ATV rack system comprises a base frame and a two pairs of fastener assemblies. The base frame is defined by a top tier and a bottom tier and additionally includes a proximal end configured to attach to a factory ATV rack and a distal end having an elevated backstop. The top tier provides the primary support structure and an attaching structure embodied as a pair of top fastener assemblies. The bottom tier provides an additional stabilizing aspect in the form of a pair of bottom fastener assemblies which assists the quick release ATV rack system in fastening to the factory rack on an ATV.

8 Claims, 3 Drawing Sheets

QUICK RELEASE ATV RACK SYSTEM

BACKGROUND OF THE INVENTION

1. Field of the Invention

This invention relates generally to vehicle accessories and, more particularly, to a rack system adapted to attach to existing structures on vehicles without the need for tools.

2. Description of the Prior Art

All terrain vehicles ("ATV") and the use of the same in activities such as camping, hiking, and other outdoor activities is well known. At this point, ATV designs are relatively standard and include passenger areas such as seating and cargo racks. A common problem which exists, however, with the passenger areas of ATVs is a lack of options to expand the available cargo space for beyond what is given without taking away from passenger seating space. Because of this, users seeking to carry additional cargo than what can be safely stored in the existing cargo area must oftentimes remove the passenger seat to include such additional cargo. In cases wherein it is desired to carry a passenger and additional cargo, a user may be unable to accomplish the same.

Thus, there remains a need for a quick release ATV rack system which would allow a user to selectively increase the cargo space available on an ATV with a temporary, add on structure. It would be helpful if such a quick release ATV rack system eliminated the need for a user to have utilize additional tools to securely attach or detach it. It would be additionally desirable for such a quick release ATV rack system to be configured to fasten to existing racks on an ATV.

The Applicant's invention described herein provides for ATV rack system adapted to releasably fasten to the existing racks of an ATV. The primary components of Applicant's quick release ATV rack system are a steel frame and a plurality of fastening members. When in operation, the quick release ATV rack system allows a user to increase the available cargo storage space on an ATV without effecting passenger space or permanently altering the ATV. As a result, many of the limitations imposed by the prior art are removed.

SUMMARY OF THE INVENTION

A quick release ATV rack system for allowing a user to selectively increase the amount of cargo storage space on an ATV without removal of passenger seating with a removable rack. The quick release ATV rack system comprises a base frame and a two pairs of fastener assemblies. The base frame is defined by a top tier and a bottom tier and additionally includes a proximal end configured to attach to a factory ATV rack and a distal end having an elevated backstop. The top tier provides the primary support structure and an attaching structure embodied as a pair of top fastener assemblies. The bottom tier provides an additional stabilizing aspect in the form of a pair of bottom fastener assemblies which assists the quick release ATV rack system in fastening to the factory rack on an ATV.

When in operation, the bottom tier is adapted to be set into a recessed area on an ATV, typically near a recessed area where a license plate may be placed, with the bottom fastener assemblies providing an abutment to reduce sliding. The top fastener assemblies are structured to each attach to an aperture in the factory rack of an ATV and be tightened by hand or loosened and released by hand.

It is an object of this invention to provide a quick release ATV rack system which would allow a user to selectively increase the cargo space available on an ATV with a temporary, add on structure.

It is another object of this invention to provide a quick release ATV rack system which eliminates the need for a user to have utilize additional tools to securely attach or detach it.

It is yet another object of this invention to provide a quick release ATV rack system configured to fasten to existing racks on an ATV.

These and other objects will be apparent to one of skill in the art.

DETAILED DESCRIPTION OF THE INVENTION

Figure 1:
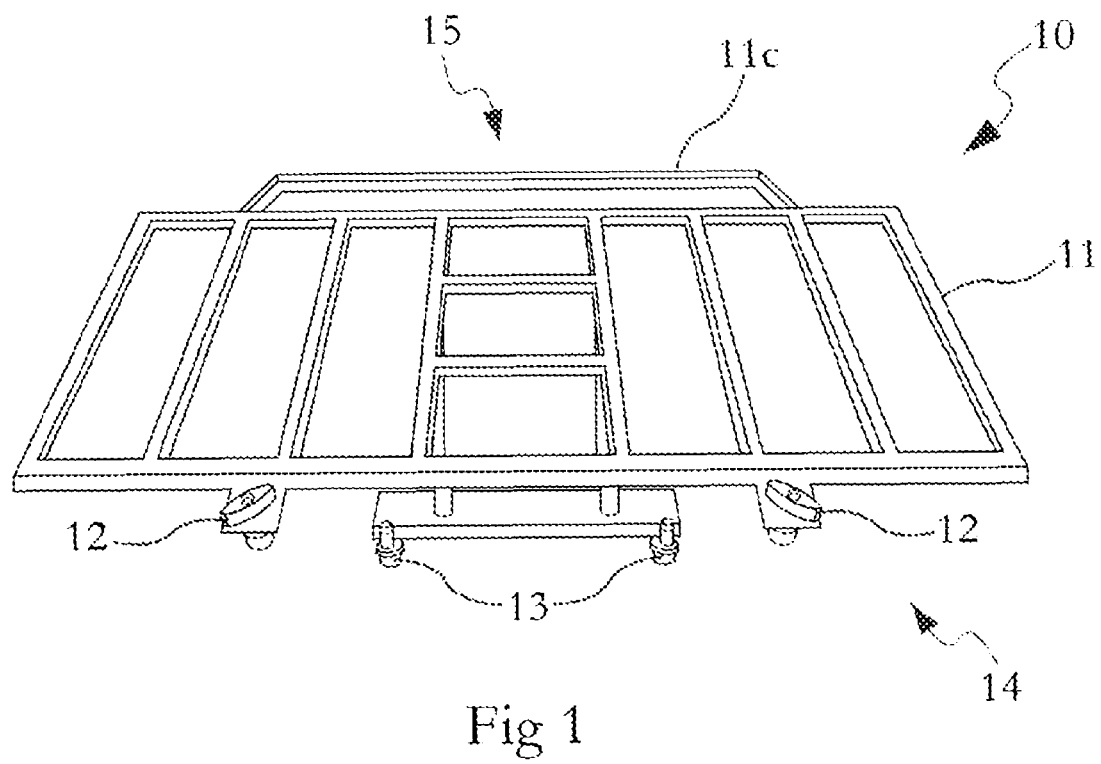
FIG. 1 is a front perspective view of a quick release ATV rack system built in accordance with the present invention.
Figure 2:
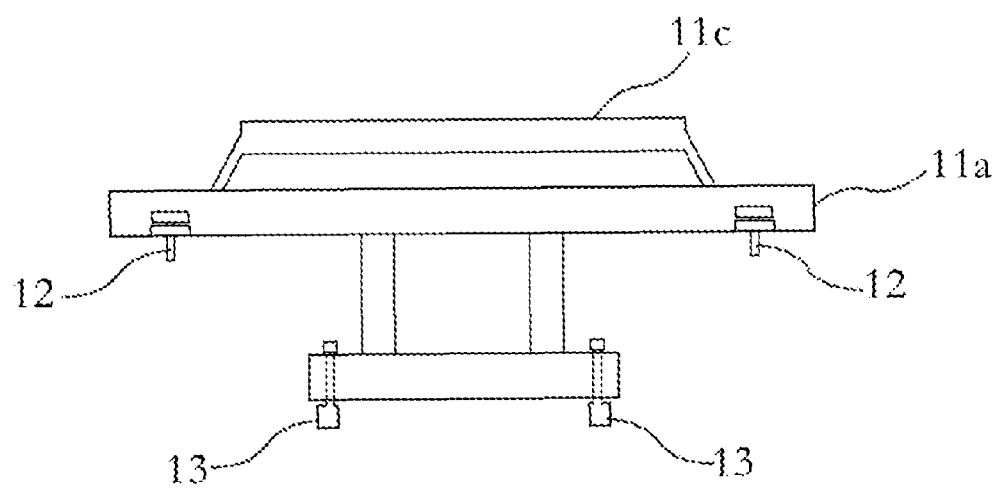
FIG. 2 is a front elevational view of a quick release ATV rack system built in accordance with the present invention.

Referring now to the drawings and in particular FIGS. 1 and 2, a quick release ATV rack system 10 is shown having a base frame 11 and a two pairs of fastener assemblies 12, 13. The base frame 11 is a 15.6 pound steel structure having bars of ¾ of an inch and with a total length of thirty-eight inches and a total depth of seventeen inches. The base frame 11 is defined by a top tier 11a and a bottom tier 11b and additionally includes a proximal end 14 and a distal end 15. The top tier 11a includes the primary support structure and the bottom tier 11b provides a fastening structure which assists the quick release ATV rack system 10 in fastening to the factory rack on an ATV.

The proximal end 14 of the base frame 11 has disposed thereon a pair of top fastener assemblies 12 and a pair of bottom fastener assemblies 13. While the top fastener assemblies 12 are disposed on the top tier 11a of the base frame 11, bottom fastener assemblies 13 are disposed on the bottom tier 11b of the base frame 11. The distal end 15 of the base frame 11 includes a back support 11c which elevates from the top tier 11a to provide a backstop structure against which items can rest and/or to which retaining structures can attach.

When the quick release ATV rack system 10 is in operation, the bottom tier 11b is adapted to be set into a recessed area on an ATV (not shown), typically near the license plate, with the lower portion of the bottom fastener assemblies 13 providing an abutment which reduces any tendency for the quick release ATV rack system 10 to slide. At the same time, the top fastener assemblies 12 are structured to each attach to an aperture in the factory rack of an ATV and be tightened by hand or loosened and released by hand.

Figure 3:
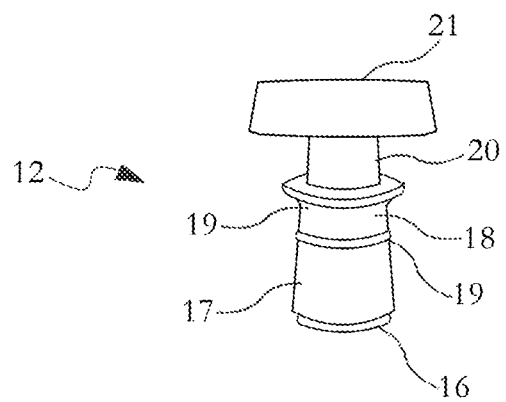
FIG. 3 is a top plan view of a top fastening assembly for a quick release ATV rack system built in accordance with the present invention.
Figure 4:
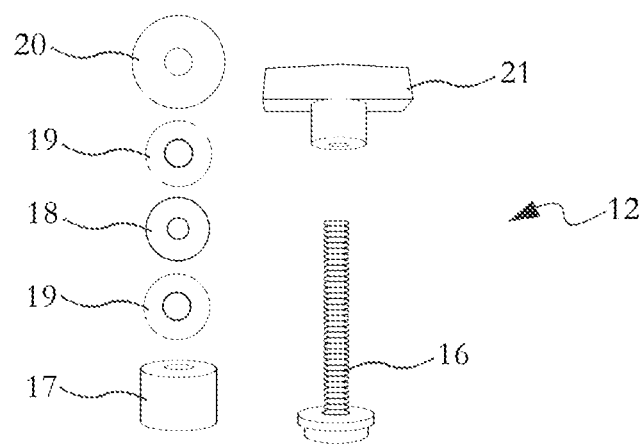
FIG. 4 is an exploded top plan view of a top fastening assembly for a quick release ATV rack system built in accordance with the present invention.

Referring now to FIGS. 3 and 4, each of the top fastener assemblies 12 include a bolt 16, an expansion washer 17, a washer having a spring characteristic 18, two standard washers 19, a oversized washer 20 and a handle 21. As assembled, the bolt 16 having all of the washers thereon is inserted through a hole in the factory rack of an ATV (not shown) a corresponding hole on the top tier 11a of the base frame 11 such that the washers are underneath the holes. The handle 21 is then placed on the threaded portion of the bolt 16 which has come fully through said holes, where it can be twisted to tighten the bolt 16, fastening the quick release ATV rack system 10 in place. It is contemplated that the expansion washer 17 and the spring washer 18 provide shock absorption so as to allow the top fastener assemblies 12 to remain tight while in use as it is understood that the ATV in use will likely be subjected to shock.

Figure 5:
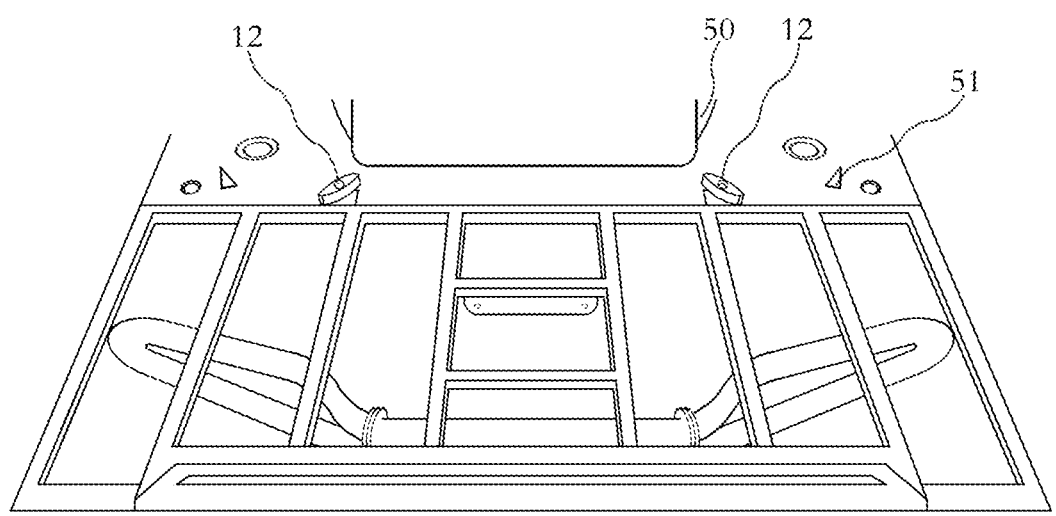
FIG. 5 is a back perspective view of a quick release ATV rack system built in accordance with the present invention attached to an ATV.

Referring now to FIG. 5, the quick release ATV rack system 10 is shown fastened to a factory rack 51 of an ATV 50. The top fastener assemblies 12 are engaged and thus the quick release ATV rack system 10 is fixed to the ATV 50. The quick release ATV rack system 10 can be removed from the ATV 50 by simply loosening the handles from the top fastener assemblies 12 and then lifting the quick release ATV rack system 10 off the ATV 50. It can then be re-attached by putting the quick release ATV rack system 10 in place, and tightening the handles on the top fastener assemblies 12. The bolts of the top fastener assemblies are able to stay in place when the ATV rack system 10 is removed and reattached.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A quick release ATV rack system, comprising: a base frame having a proximal end and a distal end, wherein the base frame includes a top tier and a bottom tier disposed on two discrete, parallel planes; wherein said bottom tier includes at least one bottom assembly configured to stabilize said quick release ATV rack system when said quick release ATV rack system is attached in a recess under the factory rack of a conventional ATV; and wherein said top tier includes at least one top fastener assembly configured to attach said quick release ATV rack system to an aperture in the factory rack of a conventional ATV.

2. The quick release ATV rack system of claim 1, wherein said top tier additionally includes a back support structure disposed on said distal end.

3. The quick release ATV rack system of claim 1, wherein said top fastener assembly includes a threaded bolt, an expansion washer and a threaded handled adapted to screw onto said expansion bolt.

4. The quick release ATV rack system of claim 1, wherein said top tier include two top fastener assemblies.

5. A method for adding cargo space to a conventional ATV without removing passenger seating, comprising the steps of: providing a base frame having a proximal end and a distal end, wherein the base frame includes a top tier and a bottom tier disposed on two discrete, parallel planes, said top tier including at least one top fastener assembly configured to attach said quick release ATV rack system to the factory rack of a conventional ATV, said bottom tier includes at least one bottom assembly configured to stabilize said quick release ATV rack system when said quick release ATV rack system is attached to the factory rack of a conventional ATV;

and attaching said base frame to a conventional ATV by engaging said fastener assembly with an aperture in the factory rack of a conventional ATV and engaging said bottom assembly in a recess under the factory rack of a conventional ATV.

6. The method of claim 5, wherein said top tier additionally includes a back support structure disposed on said distal end.

7. The method of claim 5, wherein said top fastener assembly includes a threaded bolt, an expansion washer and a threaded handled adapted to screw onto said expansion bolt.

8. The method of claim 5, wherein said top tier include two top fastener assemblies.

* * * * *